United States Patent
Yang et al.

(10) Patent No.: US 10,103,760 B1
(45) Date of Patent: Oct. 16, 2018

(54) CIRCUIT APPLIED TO DISPLAY APPARATUS AND ASSOCIATED SIGNAL PROCESSING METHOD

(71) Applicant: MStar Semiconductor, Inc., Hsinchu, Hsien (TW)

(72) Inventors: Tzu-Yi Yang, Hsinchu County (TW); Ko-Yin Lai, Hsinchu County (TW); Tai-Lai Tung, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 15/841,402

(22) Filed: Dec. 14, 2017

(30) Foreign Application Priority Data

Apr. 12, 2017 (TW) .............................. 106112126 A

(51) Int. Cl.
   *H04B 3/46* (2015.01)
   *H04B 1/10* (2006.01)
   *H04L 27/26* (2006.01)

(52) U.S. Cl.
   CPC ....... *H04B 1/1027* (2013.01); *H04L 27/2649* (2013.01)

(58) Field of Classification Search
   CPC .......................... H04B 1/1027; H04L 27/2649
   USPC ...................................................... 375/227
   See application file for complete search history.

(56) References Cited

U.S. PATENT DOCUMENTS

| 6,122,332 A * | 9/2000 | Ogata ................... H03G 3/345 327/310 |
| 6,385,261 B1 * | 5/2002 | Tsuji ....................... H04B 1/10 375/254 |
| 8,472,574 B2 * | 6/2013 | Asjadi ................... H04L 27/265 375/346 |
| 2009/0016471 A1 * | 1/2009 | Rajagopal ............. H03G 3/345 375/346 |
| 2014/0153625 A1 | 6/2014 | Vojcic et al. |
| 2015/0163007 A1 | 6/2015 | Wei et al. |

FOREIGN PATENT DOCUMENTS

TW 201517541 5/2015

\* cited by examiner

Primary Examiner — Helene Tayong
(74) Attorney, Agent, or Firm — WPAT, PC

(57) ABSTRACT

A circuit applied to a display apparatus includes a front-end circuit, a conversion circuit and an impulsive interference detection circuit. The front-end circuit converts an analog input signal into a digital input signal. The conversion circuit, coupled to the front-end circuit, converts the digital input signal from a time domain to a frequency domain to generate a frequency-domain signal. The impulsive interference detection circuit, coupled to the conversion circuit, detects a noise intensity of the frequency-domain signal to generate a detection result, which is used to determine whether the analog input signal has impulsive interference.

14 Claims, 8 Drawing Sheets

CIRCUIT APPLIED TO DISPLAY APPARATUS AND ASSOCIATED SIGNAL PROCESSING METHOD

PROCESSING METHOD

This application claims the benefit of Taiwan application Serial No. 106112126, filed Apr. 12, 2017, the subject matter of which is incorporated herein by reference.

BACKGROUND OF THE INVENTION

Field of the Invention

The invention relates in general to signal processing in a display apparatus, and more particularly to an impulsive interference detection circuit applied to a display apparatus and an associated signal processing method.

Description of the Related Art

In the Digital Video Broadcasting—Second Generation Terrestrial (DVB-T2) standard, impulsive interference is regarded as an issue that severely affects image display. Impulsive interference has large sudden and periodical amplitudes, and is usually generated by factors in the ambient environment, e.g., an operating washing machine or dishwasher, and a fast automobile passing by. FIG. 1 shows a schematic diagram of impulsive interference. In FIG. 1, the impulsive interference includes multiple burst durations having different intervals or lengths, and each of the burst durations includes one or multiple pulses. FIG. 1 depicts illustration associated with pulse cycle, pulse amplitude, pulse interval and burst interval. In the prior art, whether a received signal has impulsive interference is determined by means of detecting whether a sudden high power amplitude occurs in the signal, and signal processing of a subsequent circuit is accordingly controlled. However, for certain types of impulsive interference, the conventional detection method may result in misjudgment. For example, in the second-generation test standard announced by the Digital-TV Group (DTG), some test items have extremely long burst durations, each of which includes many pulses, e.g., one burst duration includes 400 to 40000 pulses. When the energy of such impulsive interference is strong, the conventional detection method may still successfully perform the detection. However, when the energy of such impulsive interference is weak, these test items may be overwhelmed by normal signals such that whether a received signal has impulsive interference cannot be determined simply through detecting the amplitude intensity of the received signal. In an actual application, such frequent impulsive interference with a weak strength is sufficient in affecting subsequent signal processing. Therefore, there is a need for a circuit capable of performing detection in the above situation and an associated signal processing method.

SUMMARY OF THE INVENTION

It is an object of the present invention to provide a circuit applied to a display apparatus and an associated signal processing method capable of accurately determining whether a received signal is affected by impulsive interference, and more particularly, capable of accurately detecting impulsive interference having extremely long burst durations, so as to solve the issues of the prior art.

A circuit applied to a display apparatus is disclosed according to an embodiment of the present invention. The circuit includes a front-end circuit, a conversion circuit, and an impulsive interference detection circuit. The front-end circuit converts an analog input signal into a digital input signal. The conversion circuit, coupled to the front-end circuit, converts the digital input signal from a time-domain to a frequency domain to generate a frequency-domain signal. The impulsive interference detection circuit, coupled to the conversion circuit, detects a noise intensity of the frequency-domain signal to generate a detection result. The detection result is to determine whether the analog input signal has impulsive interference.

A signal processing method applied to a display apparatus is disclosed according to another embodiment of the present invention. The signal processing method includes: converting an analog input signal into a digital input signal; converting the digital input signal from a time domain to a frequency domain to generate a frequency-domain signal; and detecting a noise intensity of the frequency-domain signal to generate a detection result. The detection result is used to determine whether the analog input signal has impulsive interference.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
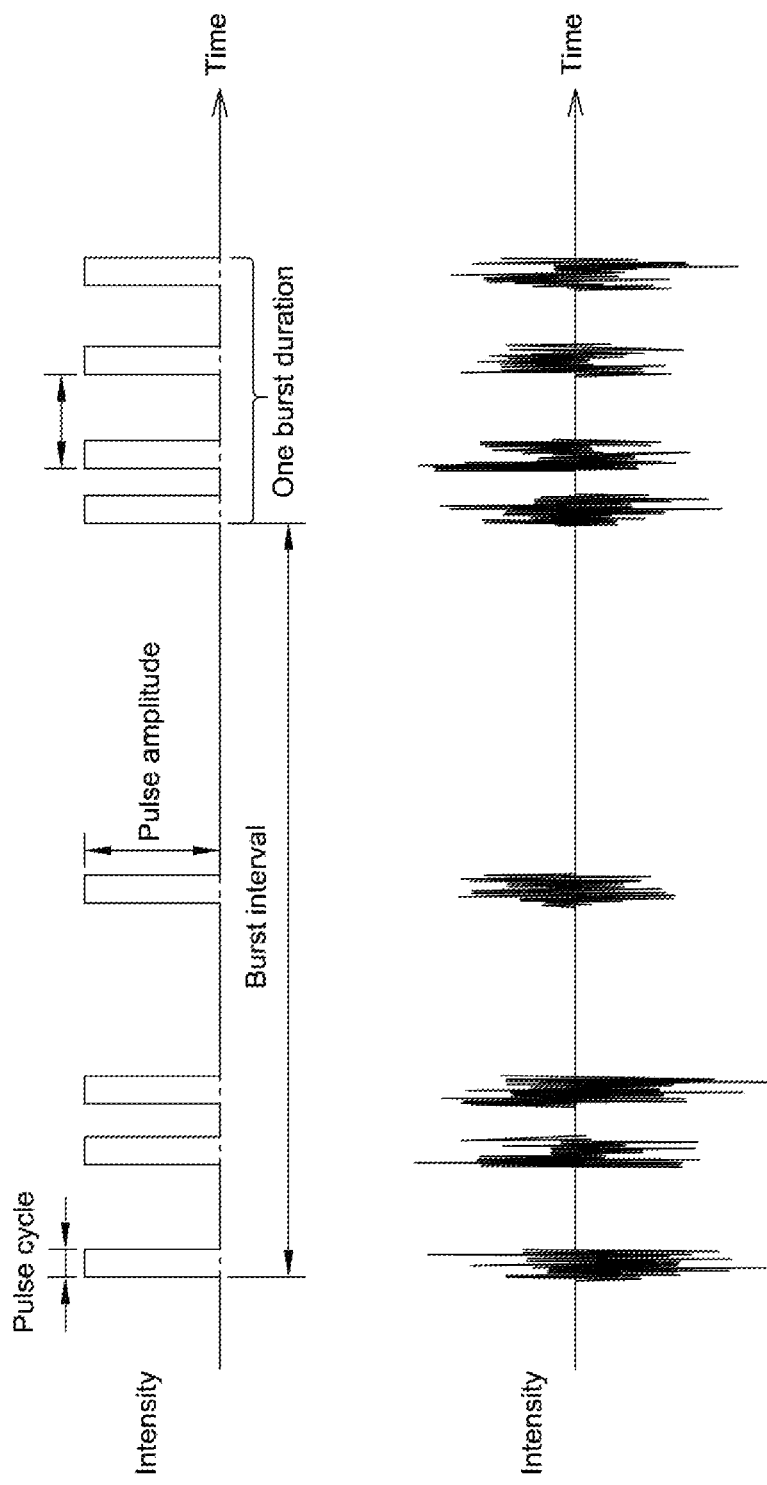
FIG. 1 is a schematic diagram of impulsive interference.

FIG. 1 shows a block diagram of a circuit 100 applied to a display apparatus according to an embodiment of the present invention. As shown in FIG. 1, the circuit 100 includes an analog front-end circuit 110, a cyclic prefix removing circuit 120, a time-domain/frequency-domain conversion circuit 130, a pilot capturing circuit 140, a data capturing circuit 142, an impulsive interference detection circuit 150, a microprocessor 160, a channel estimation circuit 170, an equalizer 180, a signal-to-noise ratio (SNR) estimation circuit 190, a de-interleaving circuit 192, a de-mapping circuit 194, a decoder 196 and a frame processing circuit 198. In this embodiment, the circuit 100 is a receiver, which disposed in a television or in a set-top box (STB) and is compliant with the Digital Television Broadcasting—Second Generation Terrestrial (DVB-T2) standard. After processing an analog input signal from an antenna, the circuit 100 generates an output signal to a back-end processing circuit in the television or the STB, so as to play the output signal on a screen. Further, the analog input signal received by the circuit 100 adopts an orthogonal frequency-division multiplexing (OFDM) modulation scheme.

Figure 2:
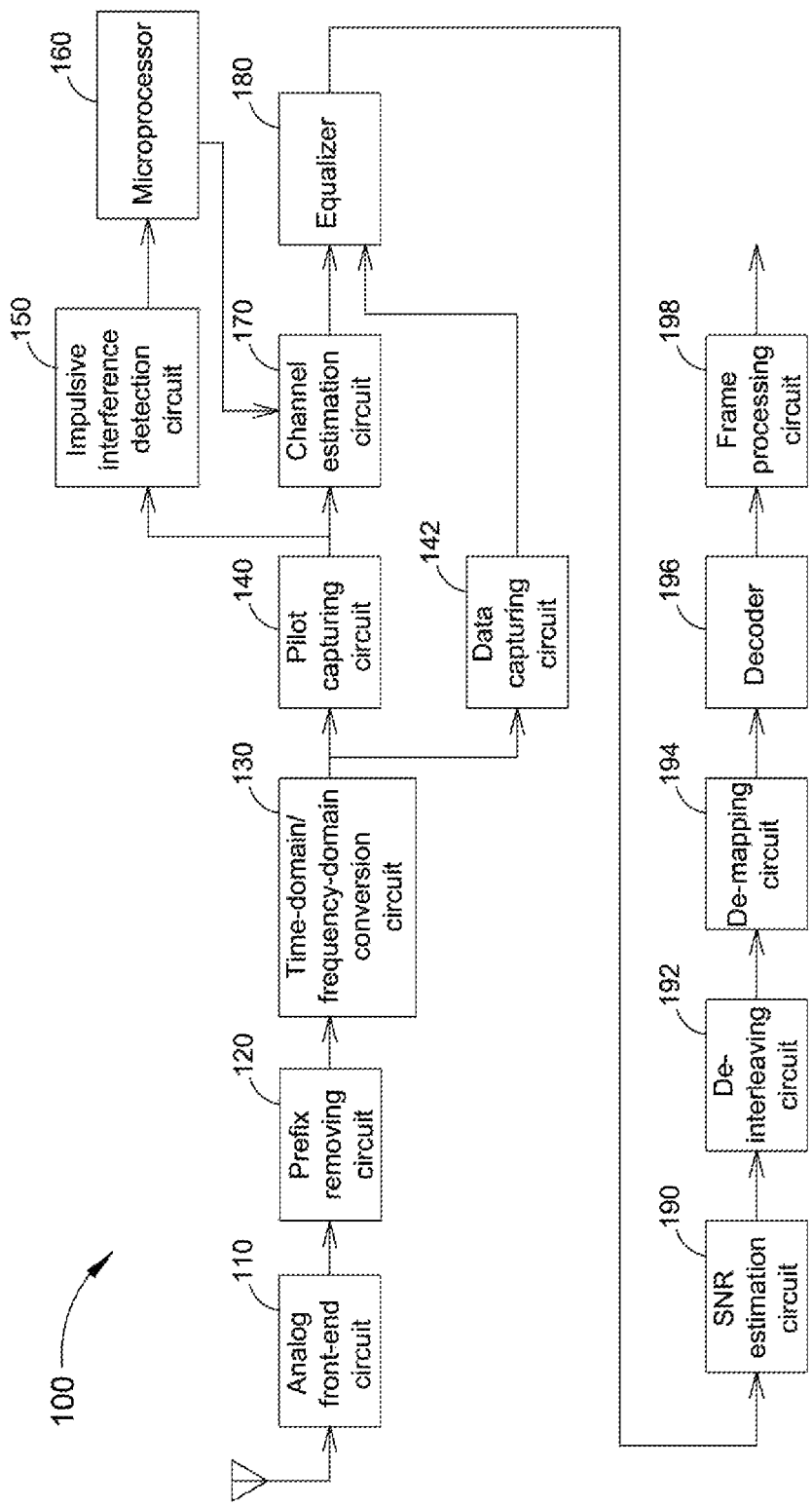
FIG. 2 is a block diagram of a circuit applied to a display apparatus according to an embodiment of the present invention.

In the circuit 100, the analog front-end circuit 110 processes the analog input signal from the antenna to generate a digital input signal. More specifically, the analog front-end circuit 110 may includes a radio-frequency-to-intermediate-frequency mixer, a bandpass filter, an analog-to-digital converter (ADC), an intermediate-frequency-to-baseband mixer, a low-pass filter.. etc, so as to process the received analog input signal to generate the digital input signal. The cyclic prefix removing circuit 120 removes a cyclic prefix from the digital input signal to generate a cyclic-prefix-removed digital input signal. The time-domain/frequency-domain conversion circuit 130 converts the cyclic-prefix-removed digital input signal from a time domain to a frequency domain to generate a frequency-domain signal. The time-domain/frequency-domain conversion circuit 130 may implement a fast Fourier transform operation. Referring to FIG. 2 showing a schematic diagram of the frequency-domain signal, the vertical axis represents OFDM symbols at different time points, each row represents one OFDM symbol, and each OFDM symbol includes an edge pilot cell, multiple data cells and multiple scattered pilot cells. Further, the horizontal axis represents the frequency, and the columns respectively correspond to different carriers.

The pilot capturing circuit 140 captures multiple pilot cells (which may be the edge pilot cell and/or the scattered pilot cells, and are exemplified by scattered pilot cells in the description below) of one symbol from the frequency-domain signal. The impulsive interference detection circuit 150 determines whether the symbol has impulsive interference according to the noise intensity of the multiple pilot cells to generate a detection result. The microprocessor 160 controls the channel estimation circuit 170 according to the detection result to adopt different calculation methods to calculate the channel frequency response corresponding to the symbol in the frequency-domain signal. On the other hand, the data capturing circuit 142 captures multiple data cells in the symbol from the frequency-domain signal, and the equalizer 180 equalizes the multiple data cells according to the channel frequency response calculated by the channel estimation circuit 170 to generate an equalized signal. The SNR estimation circuit 190 performs SNR estimation on the equalized signal according to the estimation result of the channel estimation circuit 170 to generate an SNR estimation result, and provides the SNR estimation result to the microprocessor 160 to serve as a signal processing reference. The de-interleaving circuit 192 de-interleaves the equalized signal to generate a de-interleaved signal. The de-mapping circuit 194 de-maps the de-interleaved signal to generate multiple code words. The decoder 196 performs low-density parity-check (LDPC) code and Bose-Chaudhuri-Hocquenghem (BCH) decoding on the code words to obtain multiple decoded signals that are to be processed by the subsequent frame processing circuit 198.

The focus of the present invention is parts associated with the pilot capturing circuit 140, the impulse interference detection circuit 150 and the channel estimation circuit 170. Operations of the remaining circuit elements are generally known to one person skilled in the art. Thus, the following description is given with respect to the pilot capturing circuit 140, the impulse interference detection circuit 150 and the channel estimation circuit 170.

Figure 3:
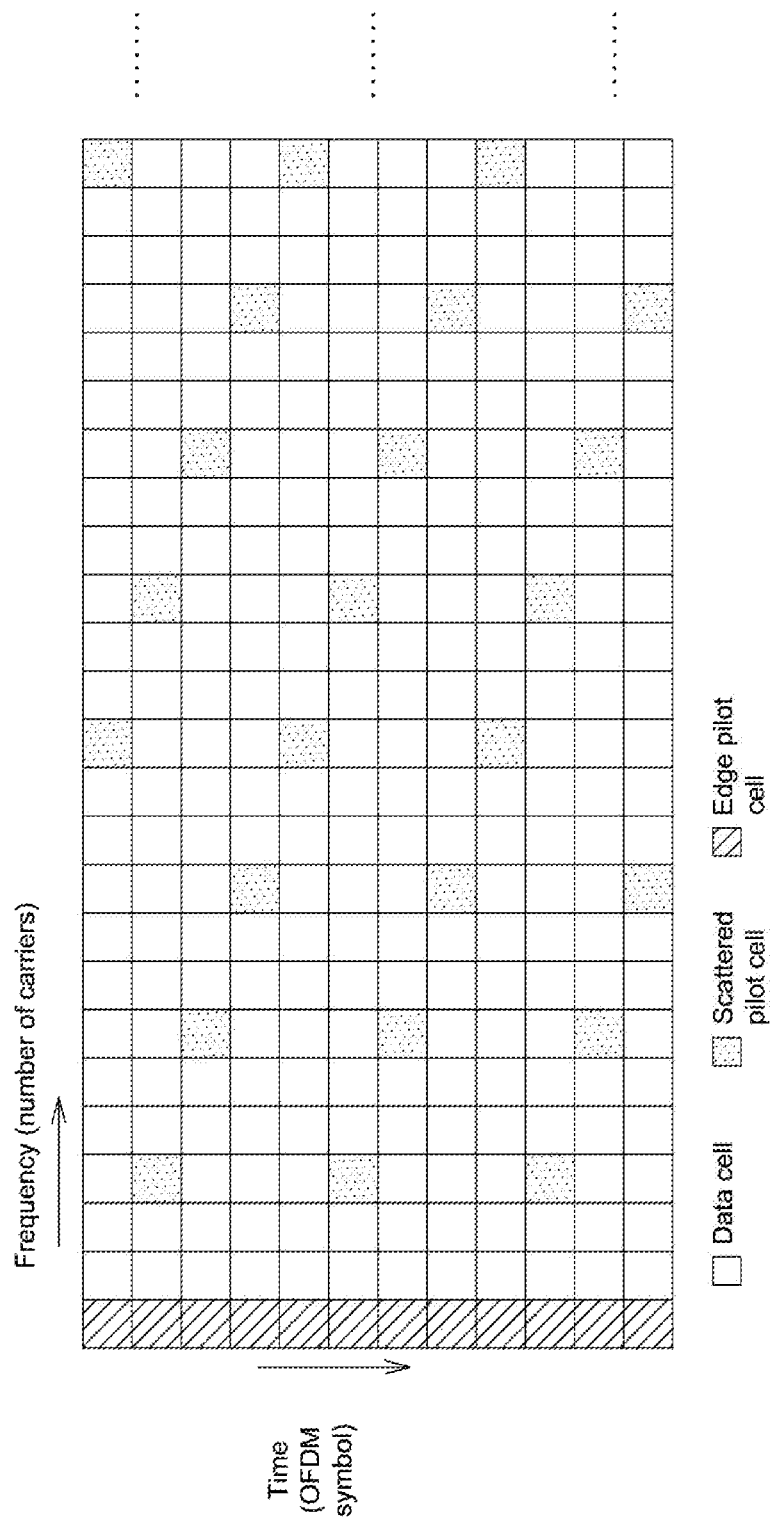
FIG. 3 is a schematic diagram of a frequency-domain signal.
Figure 4A:
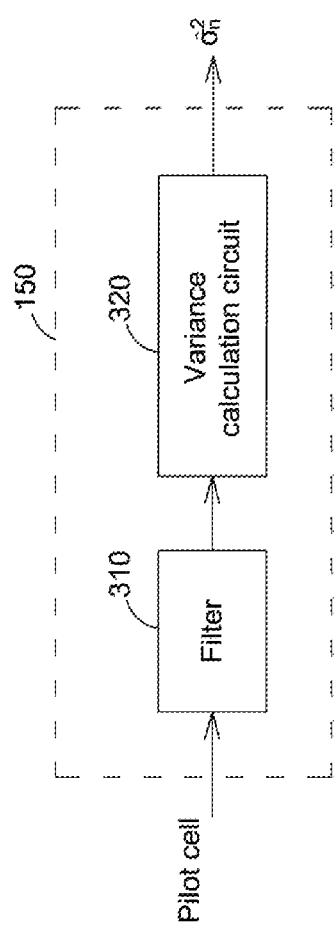
FIG. 4A is a block diagram of an impulsive interference detection circuit according to an embodiment of the present invention.
Figure 4B:
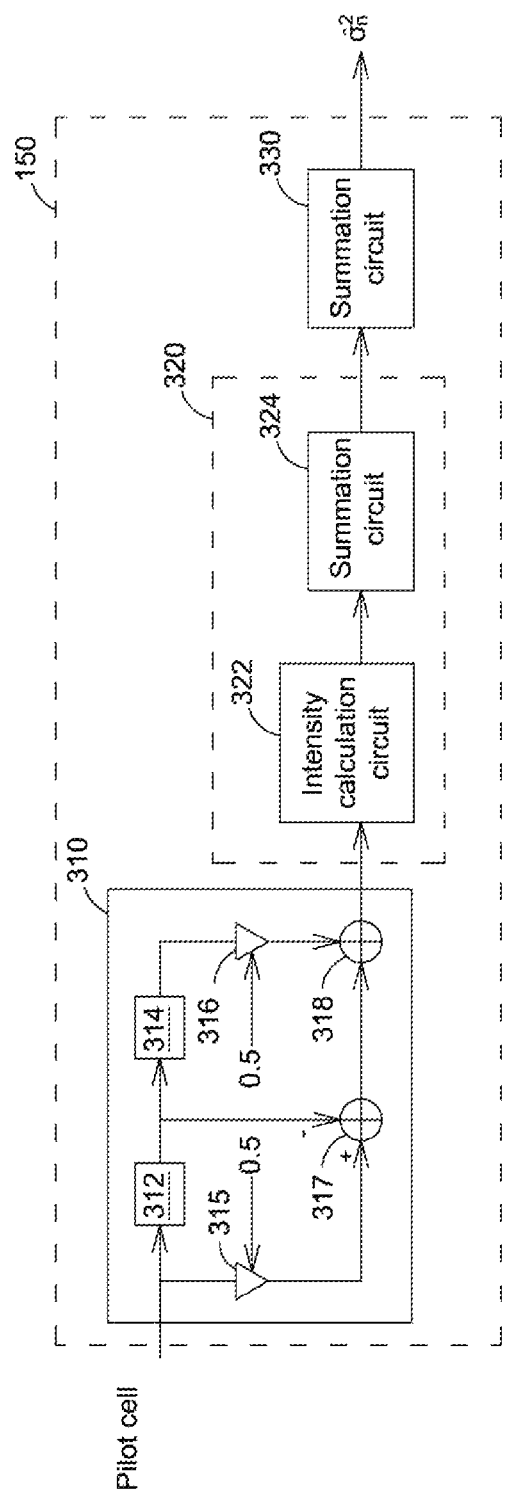
FIG. 4B is an example of a filter and a variance calculation circuit.

FIG. 4A shows a block diagram of an impulsive interference detection circuit 150 according to an embodiment of the present invention. As shown in FIG. 4A, the impulsive interference detection circuit 150 includes a filter 310 and a variance calculation circuit 320. FIG. 4B shows a detailed block diagram of the impulsive interference detection circuit 150 according to an embodiment. In this embodiment, the filter 310 is a high-pass filter. In FIG. 3B and the following description, the filter 310 is exemplified by a second-order filter. Thus, in this embodiment, the filter 310 includes two delay circuits 312 and 314, two multipliers 315 and 316 (having a multiplicand "0.5"), and two adders 317 and 318. However, the filter 310 of the present invention is not limited to having the above elements. In other embodiments, the filter 310 may be a filter having more than two orders. The variance calculation circuit 320 includes an intensity calculation circuit 322 and a summation circuit 324. In this embodiment, the impulsive interference detection circuit 150 generates variance statistical information of the noise of pilot cells of each symbol (i.e., each of the OFDM symbols in the columns in FIG. 2), and accordingly generates a detection result. Operations of each circuit element are given through equations below.

Figure 5:
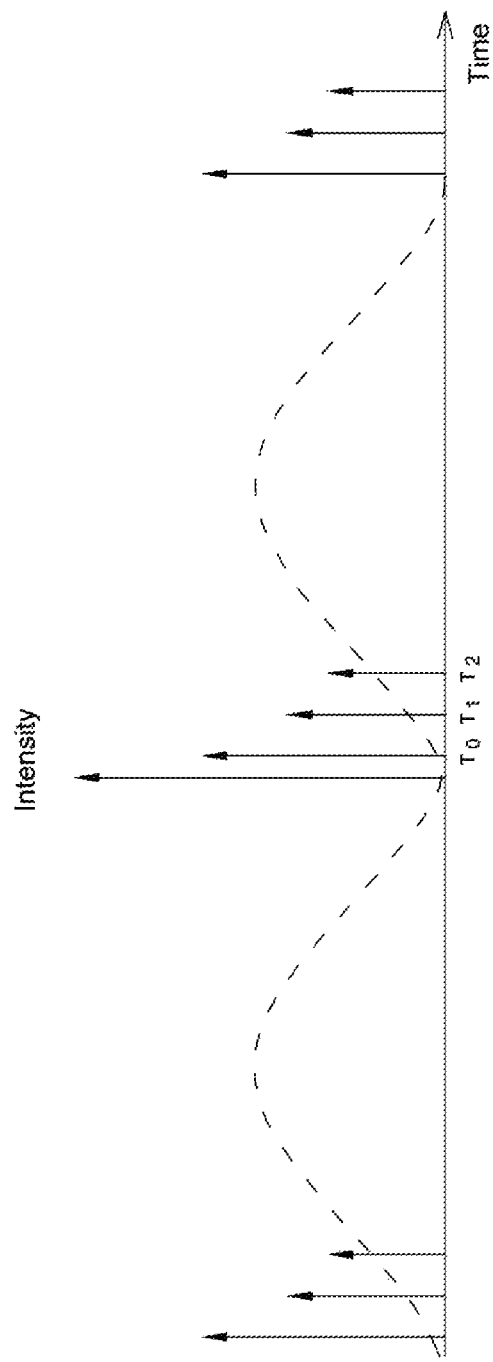
FIG. 5 is a schematic diagram of using a filter to remove channel components according to an embodiment of the present invention.

The channel frequency response of the pilot cells captured by the pilot capturing circuit 140 can be represented as: $\hat{H}_{n,k}=H_{n,k}+N_{n,k}$, where the subscript "n" represents the order of the symbol (i.e., which row in FIG. 2), the subscript "k" represents the carrier number (i.e., which column in FIG. 2), $H_{n,k}$ represents the channel frequency response of the pilot cells, and $N_{n,k}$ represents the noise of the pilot cells. The noise includes additive white Gaussian noise (AWGN), inter-carrier interference (ICI), adjacent-channel interference (ACI) and co-channel interference (CCI). Further, the channel impulse response of the pilot cells can be represented as $$h(t) = \sum_{m=0}^{M-1} \delta(t-\tau_m) \cdot e^{j\theta_m},$$

where $\delta(t)$ is a delta function, $\tau_m$ and $\theta_m$ are corresponding path delay and phase, and M is the number of paths. The filter 310 filters out the channel components of the pilot cells to capture the noise components of the pilot cells. Referring to FIG. 5, the dotted part is an output of the filter 310, and parts corresponding to $\tau_0$, $\tau_1$ and $\tau_2$ are the channel components. More specifically, the filter 310 in FIG. 4B may be represented as: $H_k^{diff}=\delta[k]-0.5\cdot(\delta[k+1]+\delta[k-1])$, which is correspondingly, in the time domain, $$h^{diff}(t) = 1 - \cos\left(2\pi\frac{t}{T_{sp}}\right).$$

Thus, the output of the filter 310 in FIG. 3 can be represented as:
$\hat{H}_{n,k}-0.5(\hat{H}_{n,k-1})=(\delta[k]-0.5\cdot(\delta[k+1]+\delta[k-1]))\otimes\hat{H}_{n,k}$ = $H_k^{diff\otimes\hat{H}}{}_{n,k}$ =$H_k^{diff\otimes(H}{}_{n,k}+n_{n,k})$ =$H_k^{diff\otimes H}{}_{n,k}+H_k^{diff\otimes N}{}_{n,k}$ ≈ $H_k^{diff\otimes N}{}_{n,k}=N_{n,k}-0.5(N_{n,k}+1+N_{n,k-1})$ In brief, the data outputted by the filter 310 each time is a difference between the noise components of one pilot cell and the average of the noise components of two left and right adjacent pilot cells.

Next, the variance calculation circuit 320 calculates the variance statistical information of the noise of the pilot cells of each symbol. More specifically, the intensity calculation circuit 322 calculates the difference between noises outputted by the filter 310, e.g., the intensity calculation circuit 322 calculates the square of the output of the filter 310 and uses the square as its output. The summation circuit 324 sums the output of the intensity calculation circuit 322 to generate the variance statistical information. In this embodiment, the impulsive interference detection circuit 150 further includes a scaling circuit 330, which scales the variance statistical information to generate a detection result. More specifically, a calculation equation of the filter 310, the intensity calculation circuit 322, the summation circuit 324 and the scaling circuit 330 can be represented as:

$$\hat{\sigma}_n^2 \approx \frac{2}{3} \frac{1}{K-2} \sum_{k=1}^{K-2} \left| N_{n,k} - \frac{1}{2}(N_{n,k-1} + N_{n,k+1}) \right|^2$$

$$= \frac{2}{3} \frac{1}{K-2} \sum_{k=1}^{K-2} \left\{ |N_{n,k}|^2 + \frac{1}{4}(|N_{n,k-1}|^2 + |N_{n,k+1}|^2) - \mathrm{Re}\left\{ N_{n,k}(N_{n,k-1}^* + N_{n,k+1}^*) + \frac{1}{2} N_{n,k-1} N_{n,k+1}^* \right\} \right\}$$

The above equation further describes how the scaling circuit 320 processes multiple sets of variance statistical information outputted by the variance calculation circuit 320 to generate the detection result, where "K-2" represents the number of pilot cells calculated, and $$\text{``}\frac{2}{3}\frac{1}{K-2}\text{''}$$

represents an adjustment ratio of the scaling circuit 330. If the noise variance of each pilot cell is defined as $\sigma_{n,k}^2 = E\{|n_{n,k}|^2\}$, the calculation equation of the filter 310, the intensity calculation circuit 322, the summation circuit 324 and the scaling circuit 330 can be represented as:

$$E\{\hat{\sigma}_n^2\} = \frac{2}{3}\frac{1}{K-2}\sum_{k=1}^{K-2} E\left\{|n_{n,k}|^2 + \frac{1}{4}(|n_{n,k-1}|^2 + |n_{n,k+1}|^2) - \mathrm{Re}\left\{ n_{n,k}(n_{n,k-1}^* + n_{n,k+1}^*) + \frac{1}{2} n_{n,k-1} n_{n,k+1}^* \right\} \right\}$$

$$= \frac{2}{3}\frac{1}{K-2}\sum_{k=1}^{K-2}\left(\sigma_{n,k}^2 + \frac{1}{4}\sigma_{n,k-1}^2 + \frac{1}{4}\sigma_{n,k+1}^2\right)$$

$$= \frac{1}{K-2}\sum_{k=0}^{K-1}\sigma_{n,k}^2 - \frac{1}{6(K-2)}(5\sigma_{n,0}^2 + 5\sigma_{n,K-1}^2 + \sigma_{n,1}^2 + \sigma_{n,K-2}^2).$$

The noise variance of the symbol is again defined as the average of the variance of each pilot cell, and the noise variance of the symbol can be represented as:

$$\overline{\sigma}_n^2 \equiv \frac{1}{K}\sum_{k=0}^{K-1}\sigma_{n,k}^2.$$

If the value of K is large, the output of the impulsive interference detection circuit 150 can be represented as:

$$E\{\hat{\sigma}_n^2\} = \frac{K}{K-2}\left(\frac{1}{K}\sum_{k=0}^{K-1}\sigma_{n,k}^2\right) - \frac{1}{6(K-2)}(5\sigma_{n,0}^2 + 5\sigma_{n,K-1}^2 + \sigma_{n,1}^2 + \sigma_{n,K-2}^2)$$

$$\to \frac{1}{K}\sum_{k=0}^{K-1}\sigma_{n,k}^2 = \overline{\sigma}_n^2.$$

As previously described, the impulsive interference detection circuit 150 can reliably output the average of the noise variance of each carrier frequency in each symbol as the detection result.

Figure 6:
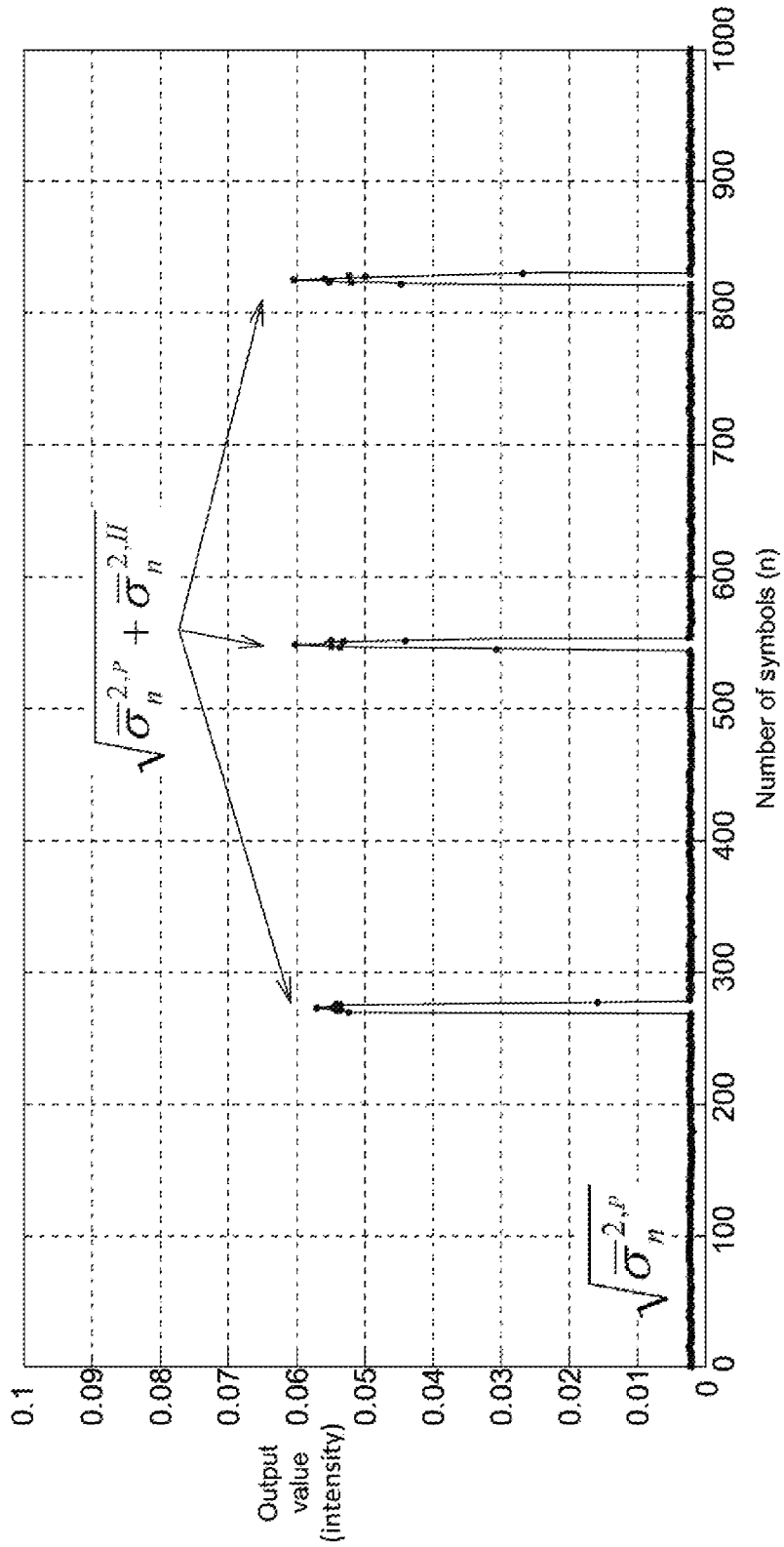
FIG. 6 is a schematic diagram of noise variances generated by an impulsive interference detection circuit with respect to multiple symbols.

The noise of each pilot cell includes intrinsic noise and noise caused by impulsive interference. The intrinsic noise may include the AWGN, ICI, ACI and CCI previously stated, and thus the noise variance of each symbol outputted by the impulsive interference detection circuit 150 also includes intrinsic noise and impulsive interference. However, in the above calculation process, particularly noticeable values are generated to represent certain occasional properties of impulsive interference. Thus, the method according to the embodiment can more accurately determine whether each symbol is affected by impulsive interference. For example, FIG. 6 shows a schematic diagram of the average (the detection value of the detection circuit 150) of the noise variance of carrier frequencies generated by the impulsive interference detection circuit 150 with respect to multiple symbols. In FIG. 6, $\overline{\sigma}_n^{2,P}$ is the variance of intrinsic noise of the $n^{th}$ symbol, and $\overline{\sigma}_n^{2,H}$ is the variance of noise caused by impulsive interference of the $n^{th}$ symbol. Thus, by determining whether the output of the impulsive interference detection circuit 150 is greater than a threshold, whether the current symbol receives impulsive interference can be determined.

Further, when it is determined that a symbol has impulsive interference, the microprocessor 160 can accordingly control the channel estimation circuit 170 to adopt a corresponding channel estimation method to mitigate the effect of impulsive interference on channel estimation. More specifically, because the frequency-domain signal outputted by the time-domain/frequency-domain conversion circuit 130 includes amplitude and phase information of pilot cells, the channel estimation circuit 170 can learn the channel frequency response of each pilot cell to further calculate the channel frequency response of each data cell. In the calculation for channel frequency response for a data cell, the channel estimation circuit 170 usually calculates an average or a weighted average of the channel frequency response of several pilot cells closest to the data cell. Taking FIG. 2 for example, for any data cell, the channel frequency response of pilot cells within a surrounding range A*A can be used as a calculation basis, where A is any appropriate positive integer. Further, a larger value of "A" represents higher intrinsic noise elimination and lower sensitivity, and a smaller value of "A" represents lower intrinsic noise elimination and higher sensitivity. In this embodiment, when impulsive interference is absent, the value of "A" may be configured to be a larger number, i.e., channel frequency response of a larger number of adjacent pilot cells can be referred to when calculating the channel frequency response of each data cell; when impulsive interference is present, the value of "A" may be configured to be a smaller number, i.e., channel frequency response of a smaller number of adjacent pilot cells can be referred to when calculating the channel frequency response of each data cell, thus preventing the effect of impulsive interference from other symbols. Further, when it is determined that impulsive interference is present, the microprocessor 160 can accordingly control the SNR detection circuit 190 to adopt a corresponding SNR detection method.

Figure 7:
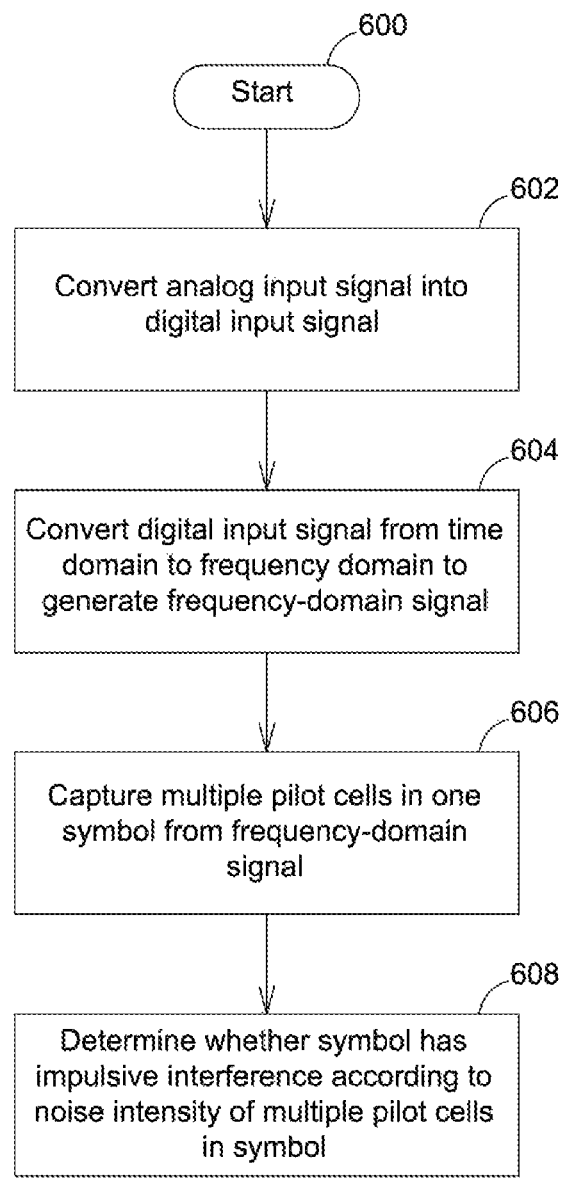
FIG. 7 is a flowchart of a signal processing method applied to a display apparatus according to an embodiment of the present invention.

FIG. 7 shows a flowchart of a signal processing method applied to a display apparatus according to an embodiment of the present invention. Referring to the FIG. 1 to FIG. 6 and the associated description, the process in FIG. 7 is as below.

In step 600, the process begins.

In step 602, an analog input signal is converted into a digital input signal.

In step 604, the digital input signal is converted from a time domain to a frequency domain to generate a frequency-domain signal.

In step 606, multiple pilot cells of one symbol are captured from the frequency-domain signal.

In step 608, whether the symbol has impulsive interference is determined according to a noise intensity of the multiple pilot cells of the symbol.

In summary, in the circuit applied to a display apparatus of the present invention, multiple pilot cells of one symbol are captured in the frequency domain, and noise variances of carrier frequencies of the symbol are calculated according to the multiple pilot cells to determine whether the symbol is affected by impulsive interference. With the circuit and method provided by the embodiments of the present invention, impulsive interference can be accurately and quickly determined, and a signal processing method of a subsequent signal processing circuit can be accordingly determined, thus obtaining optimum signal quality.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A circuit, applied in a display apparatus, comprising:
a front-end circuit, converting an analog input signal into a digital input signal;
a conversion circuit, coupled to the front-end circuit, converting the digital input signal from a time domain to a frequency domain to generate a frequency-domain signal;
wherein the frequency-domain signal includes a plurality of symbols, and each of the symbols includes a plurality of pilot cells;
an impulsive interference detection circuit, coupled to the conversion circuit, detecting a noise intensity of the frequency-domain signal to generate a detection result, wherein the detection result is used to determine whether the analog input signal has impulsive interference; and
a pilot capturing circuit, coupled between the conversion circuit and the impulsive interference detection circuit, capturing the plurality of pilot cells in one symbol of the plurality of symbols from the frequency-domain signal;
wherein, the impulsive interference detection circuit generates the detection result according to a noise intensity of the plurality of pilot cells in the symbol.

2. The circuit according to claim 1, wherein each of the plurality of symbols further includes a plurality of data cells, and the impulsive interference detection circuit generates the detection result without referring to a noise intensity of the plurality of data cells.

3. The circuit according to claim 1, wherein the impulsive interference detection circuit generates the detection result according to a variance of the noise intensity of the plurality of pilot cells in the symbol.

4. The circuit according to claim 1, wherein the impulsive interference detection circuit comprises:
a filter, filtering the plurality of pilot cells of the symbol to remove channel components of the plurality of pilot cells to generate a filtered signal; and
a variance calculation circuit, coupled to the filter, calculating variance statistical information of noise of the plurality of pilot cells according to the filtered signal;
wherein, the detection result is generated according to the variance statistical information.

5. The circuit according to claim 4, wherein th filter is a multi-order filter, the filter calculates a variance corresponding to each of the plurality of pilot cells according to each of the plurality of pilot cells and the adjacent pilot cells of each of the plurality of pilot cells, and the variance calculation circuit comprises:
an intensity calculation circuit, calculating an intensity value of the variance corresponding to each of the plurality of pilot cells; and
a summation circuit, coupled to the intensity calculation circuit, summing the intensity value of the variance corresponding to each of the plurality of pilot cells to obtain the variance statistical information.

6. The circuit according to claim 4, wherein the impulsive interference circuit further comprises:
a scaling circuit, coupled to the variance calculation circuit, scaling the variance statistical information to serve as the detection result.

7. The circuit according to claim 1, wherein each of the plurality of symbols further comprises a plurality of data cells, the circuit further comprising:
a channel estimation circuit, coupled to the pilot capturing circuit, estimating a channel frequency response of the plurality of pilot cells, and accordingly calculating a channel frequency response of the plurality of data cells according to the channel frequency response of the plurality of pilot cells;
wherein, for each of the plurality of data cells, a quantity of adjacent pilot cells used as a reference for calculating the channel frequency response is determined according to the detection result.

8. A signal processing method, applied to a display apparatus, comprising:
converting an analog input signal to a digital input signal; wherein the analog input signal adopts an orthogonal frequency-division multiplexing (OFDM) modulation scheme;
converting the digital input signal from a time domain to a frequency domain to generate a frequency-domain signal;
wherein the frequency-domain signal includes a plurality of symbols, and each of the plurality of symbols includes a plurality of pilot cells;
detecting a noise intensity of the frequency-domain signal to generate a detection result, wherein the detection result is used to determine whether the analog input signal has impulsive interference; and capturing the plurality of pilot cells in one symbol of the plurality of symbols from the frequency-domain signal; and the step of detecting the noise intensity of the frequency-domain signal to generate the detection result comprises:

generating the detection result according to a noise intensity of the plurality of pilot cells in the symbol.

9. The signal processing method according to claim 8, wherein each of the plurality of symbols further includes a plurality of data cells, and the step of generating the detection result performs determination without referring to a noise intensity of the plurality of data cells.

10. The signal processing method according to claim 8, wherein the step of generating the detection result according to the noise intensity of the plurality of pilot cells in the symbol generates the detection result according to a variance of noises of the plurality of pilot cells in the symbol.

11. The signal processing method according to claim 8, wherein the step of generating the detection result according to the noise intensity of the plurality of pilot cells in the symbol comprises:

filtering the plurality of pilot cells of the symbol to remove channel components of the plurality of pilot cells to generate a filtered signal;

calculating variance statistical information of noises of the plurality of pilot cells according to the filtered signal; and generating the detection result according to the variance statistical information.

12. The signal processing method according to claim 11, wherein the step of generating the filtered signal according to the plurality of pilot cells of the symbol is performed by a multi-order filter, the filter calculates a variance corresponding to each of the plurality of pilot cells according to each of the plurality of pilot cells and the adjacent pilot cells of each of the plurality of pilot cells, and the step of calculating the variance statistical information of the plurality of the noises of the pilot cells comprises:

calculating an intensity value of the variance corresponding to each of the plurality of pilot cells; and summing the intensity value of the variance corresponding to each of the plurality of pilot cells to obtain the variance statistical information.

13. The signal processing method according to claim 11, wherein the step of generating the detection result according to the variance statistical information comprises:

scaling the variance statistical information to serve as the detection result.

14. The signal processing method according to claim 8, wherein each of the plurality of symbols further comprises a plurality of data cells, the signal processing method further comprising:

estimating a channel frequency response of the plurality of pilot cells; and calculating a channel frequency response of the plurality of data cells according to the channel frequency response of the plurality of pilot cells;

wherein, for each of the plurality of data cells, a quantity of adjacent pilot cells used as a reference for calculating the channel frequency response is determined according to the detection result.

\* \* \* \* \*